United States Patent
Satou (10) Patent No.: US 11,390,469 B2
(45) Date of Patent: Jul. 19, 2022

(54) ARTICLE TAKEOUT APPARATUS AND ARTICLE TAKEOUT METHOD USING SENSOR AND ROBOT

(71) Applicant: Fanuc Corporation, Yamanashi (JP)

(72) Inventor: Taiga Satou, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 284 days.

(21) Appl. No.: 16/296,979

(22) Filed: Mar. 8, 2019

(65) Prior Publication Data

US 2019/0291972 A1    Sep. 26, 2019

(30) Foreign Application Priority Data

Mar. 20, 2018    (JP) .............................. JP2018-052484

(51) Int. Cl.
*B25J 9/16*        (2006.01)
*B65G 47/90*   (2006.01)

(52) U.S. Cl.
CPC .......... *B65G 47/905* (2013.01); *B25J 9/1697* (2013.01); *G05B 2219/39508* (2013.01); *G05B 2219/40053* (2013.01)

(58) Field of Classification Search
CPC ........... G05B 2219/40053; G05B 2219/40607; G05B 2219/37131; G05B 2219/45063; G05B 2219/42318; G05B 2219/40613; G01B 21/16; B25J 9/1653; B25J 9/1669; B25J 9/1697
See application file for complete search history.

(56) References Cited

U.S. PATENT DOCUMENTS

| | | | |
|---|---|---|---|
| 7,123,992 B2 | 10/2006 | Ban et al. | |
| 8,380,342 B2 | 2/2013 | Ban et al. | |
| 8,554,359 B2 | 10/2013 | Ichimaru | |
| 9,050,722 B2 | 6/2015 | Satou | |
| 9,302,391 B2 * | 4/2016 | Iio | G06T 1/0014 |
| 10,040,199 B2 * | 8/2018 | Ito | B25J 9/1697 |
| 10,894,324 B2 * | 1/2021 | Watanabe | B25J 9/1666 |

(Continued)

FOREIGN PATENT DOCUMENTS

| | | |
|---|---|---|
| DE | 10319253 A1 | 12/2004 |
| DE | 102016206980 A1 | 10/2017 |

(Continued)

*Primary Examiner* — Ryan Rink
(74) *Attorney, Agent, or Firm* — RatnerPrestia (57) ABSTRACT

Article takeout apparatus and article takeout method capable of eliminating unnecessary measurements. The article takeout apparatus includes a sensor, a position/posture detector to detect a position/posture of an article in a working area, a robot configured to take out the article, a data storage to store evaluation data to evaluate a plurality of sensor measurement positions corresponding to respective positions at which the sensor measures a plurality of measurement areas, a data update section to update the evaluation data after the measurement area is measured by the sensor and after the article is taken out by the robot, an evaluation value calculator to calculate a comprehensive evaluation value of the working area on the basis of the updated evaluation data, and a sensor position selector to select a next sensor measurement position from among the plurality of sensor measurement positions on the basis of the calculated comprehensive evaluation value.

11 Claims, 9 Drawing Sheets

(56) References Cited

U.S. PATENT DOCUMENTS

| | | | | |
|---|---|---|---|---|
| 2004/0019405 | A1* | 1/2004 | Ban | G06T 7/74 |
| | | | | 700/213 |
| 2008/0082213 | A1* | 4/2008 | Ban | G06T 7/73 |
| | | | | 700/260 |
| 2010/0274391 | A1 | 10/2010 | Dai | |
| 2011/0301744 | A1* | 12/2011 | Ichimaru | B25J 9/1687 |
| | | | | 700/214 |
| 2012/0029686 | A1* | 2/2012 | Ban | B25J 9/1697 |
| | | | | 700/218 |
| 2017/0256046 | A1* | 9/2017 | Watanabe | G06V 10/42 |
| 2019/0143507 | A1* | 5/2019 | Nishina | G06V 10/255 |
| | | | | 700/245 |

FOREIGN PATENT DOCUMENTS

| | | |
|---|---|---|
| JP | 01134573 A | 5/1989 |
| JP | 2001-300878 A | 10/2001 |
| JP | 2003-010155 A | 1/2003 |
| JP | 2004160567 A | 6/2004 |
| JP | 2008-087074 A | 4/2008 |
| JP | 2011251384 A | 12/2011 |
| JP | 2012024903 A | 2/2012 |
| JP | 2013-257182 A | 12/2013 |
| JP | 2014054715 A | 3/2014 |
| JP | 2017-042859 A | 3/2017 |

\* cited by examiner

ARTICLE TAKEOUT APPARATUS AND ARTICLE TAKEOUT METHOD USING SENSOR AND ROBOT

CROSS-REFERENCE TO RELATED APPLICATIONS

This application is a new U.S. Patent Application that claims benefit of Japanese Patent Application No. 2018-052484, filed Mar. 20, 2018, the disclosure of this application is being incorporated herein by reference in its entirety for all purposes.

BACKGROUND OF THE INVENTION

1. Field of the Invention

The present invention relates to an article takeout apparatus and an article takeout method using a sensor and a robot.

2. Description of the Related Art

There has been known a system in which the respective positions and postures of a plurality of articles arranged in a working area defined by a pallet or container are measured by using a sensor such as a camera, and the articles are taken out by using a robot on the basis of the measurement results (e.g., see JP 2013-257182 A, JP 2003-010155 A, JP 2001-300878 A, JP 2008-087074 A, and JP 2017-042859 A).

In many article takeout apparatuses, one sensor is installed and configured to include the entire working area in the measurement range thereof (a field of vision), and in some cases, the working area is larger than the measurement range of the sensor, depending on a size of the working area or specifications of the sensor. In this case, only the installation of one sensor at a specific position fails to measure the entire working area. Thus, a method of covering the entirety of the working area is conceivable by mounting a sensor on a movable section such as a robot arm, etc., and conducting measurements multiple times while changing the position of the sensor.

However, when a plurality of articles are lopsidedly arranged in the working area, in some cases, it is inefficient to conduct measurements multiple times (at multiple positions). For example, in a device in which the entirety of a working area can be measured by conducting measurements with a sensor at multiple positions that are different from each other, when settings are made in which measurements are conducted again at all the positions every time one article is taken out, the measurements are meaningless at positions except for the position at which the article having been taken out is measured, and a time required for taking out the articles is extended.

In addition, in a case where settings are made wherein measurements are sequentially conducted at multiple positions in accordance with predetermined order and when an article to be taken out is detected and taken out, in some cases, it is meaningless to conduct the measurement since the measurement at the first position in such order is certainly conducted after the article is taken out. Thus, in the article takeout apparatus in which a working area is larger than the measurement range of a sensor, it is desirable to reduce the time of unnecessary measurements to a minimum.

SUMMARY OF THE INVENTION

One aspect of the present disclosure is an article takeout apparatus comprising: a sensor having a measurement range that is smaller than a working area in which a plurality of articles are arranged, and configured to be movable relative to the working area; a position/posture detector configured to detect a position/posture of the article on a basis of a measurement result of the measurement area that is a part of the working area with the sensor; a robot configured to take out the plurality of articles arranged in the measurement area on a basis of a detection result of the position/posture detector; a data storage configured to store evaluation data to evaluate a plurality of sensor measurement positions corresponding to respective positions at which the sensor measures a plurality of the measurement areas; a data update section configured to update the evaluation data after the measurement area is measured by the sensor and after the article is taken out by the robot; an evaluation value calculator configured to calculate a comprehensive evaluation value to evaluate a measurement state of an entirety of the working area on a basis of the updated evaluation data; and a sensor position selector configured to select a next sensor measurement position of the sensor from among the plurality of sensor measurement positions on a basis of the comprehensive evaluation value.

Another aspect of the present disclosure is an article takeout method using a sensor having a measurement range that is smaller than a working area in which a plurality of articles are arranged and configured to be movable relative to the working area, a position/posture detector configured to detect a position/posture of the article on a basis of a measurement result of a measurement area that is a part of the working area with the sensor, and a robot configured to take out the plurality of articles arranged in the measurement area on a basis of a detection result of the position/posture detector, the article takeout method comprising: storing evaluation data to evaluate a plurality of sensor measurement positions corresponding to respective positions at which the sensor measures a plurality of the measurement areas; updating the evaluation data after the measurement area is measured by the sensor and after the article is taken out by the robot; calculating a comprehensive evaluation value to evaluate a measurement state of an entirety of the working area on a basis of the updated evaluation data; and selecting a next sensor measurement position of the sensor from among the plurality of sensor measurement positions on a basis of the comprehensive evaluation value.

BRIEF DESCRIPTION OF THE DRAWINGS

The above and other objects, features and advantages of the present invention will be made more apparent by the following description of the preferred embodiments thereof, with reference to the accompanying drawings, wherein.

DETAILED DESCRIPTION

First Embodiment

Figure 1:
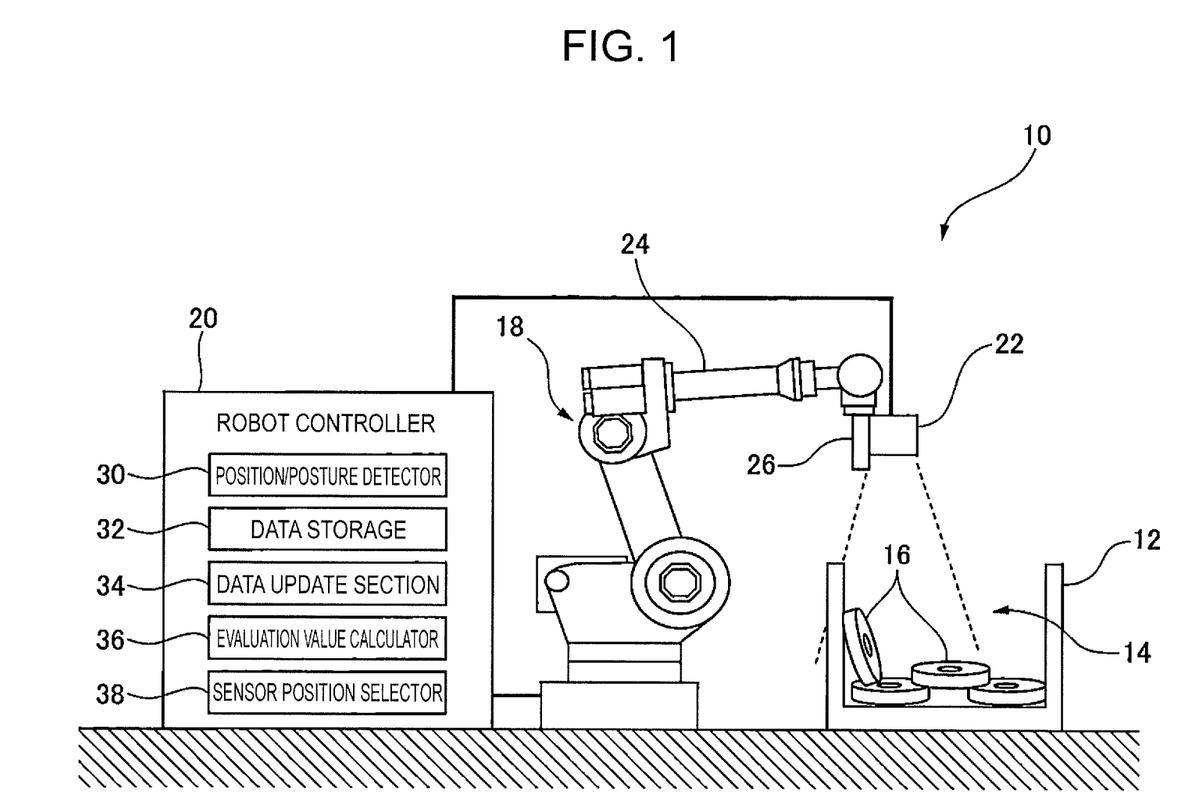
FIG. 1 is a view illustrating one configuration example of an article takeout apparatus.

FIG. 1 is a view illustrating one configuration example of an article takeout apparatus 10 according to a preferred embodiment. The article takeout apparatus (robot system) 10 includes a robot 18 configured to be capable of taking out a plurality of articles (workpieces) 16 arranged in a predetermined working area (an internal space 14 of a container 12 in the drawing), a robot controller 20 that is connected to the robot 18 and controls the robot 18, and a sensor 22 configured to be movable relative to a working area 14 (mounted on the robot 18 in the drawing).

The robot 18 is, e.g., a six-axis articulated robot, includes a movable section 24 such as a robot arm, etc.; and a hand 26 mounted on the movable section 24, and is configured to take out workpieces 16 in the working area (in many cases, one by one) on the basis of the position/posture of the workpiece 16 detected by the sensor 22 mounted on the movable section 24. As the hand 26, various types such as a gripping type, a suction type, etc., in accordance with the kinds or shapes of the workpiece 16 (a disc shape in the example illustrated) can be used.

The robot controller 20 includes a position/posture detector 30 for detecting the position/posture of the workpiece 16 on the basis of measurement results acquired with the sensor 22 by measuring a certain measurement area (described later) which is a part of the working area 14, a data storage 32 for storing evaluation data to evaluate a plurality of sensor measurement positions corresponding to respective positions of the sensor when the sensor 22 measures the working area 14, a data update section 34 for updating the evaluation data stored after the measurement area is measured by the sensor 22 and after a workpiece is taken out by the robot 18, an evaluation value calculator 36 for calculating a comprehensive evaluation value to evaluate the measurement state of the entire working area 14 on the basis of the updated evaluation data, and a sensor position selector 38 for selecting the next sensor measurement position of the sensor 22 from among a plurality of sensor measurement positions on the basis of the comprehensive evaluation value having been calculated. These functions of the robot controller 20 can be achieved by an arithmetic processing unit (processor), a memory, etc., included in the robot controller 20, but it is possible to cause another calculator (e.g., a personal computer), etc., except for the robot controller 20 to perform at least a part of these functions.

The sensor 22 is a camera such as a CCD camera or a CMOS camera, etc., connected to the robot controller 20 and can project pattern light in the working area 14 and can acquire the image of the workpiece 16. In addition, the sensor 22 may be provided as one that can measure a distance (three-dimensional position) from the sensor to each workpiece. In the embodiment, a measurement range (a field of vision) of the sensor 22 is smaller than the working area 14, and thus an area of the working area 14 measured by the sensor 22 corresponds to a part of the working area 14. Consequently, it is necessary to conduct measurements multiple times while changing the position of the sensor 22 in order to measure the entire working area.

The image (data) acquired by the sensor 22 is transmitted to the robot controller 20, and the above-described position/posture detector 30 can calculate a three-dimensional position of a surface of each workpiece (e.g., three-dimensional position and posture of each workpiece) by acquiring three-dimensional coordinates of points on a pattern captured on the image. However, the sensor 22 is not limited to these cameras, but any means can be used as long as the position/posture of each workpiece in the working area 14 can be acquired.

It is noted that, in the present disclosure, the term referred to as "position/posture" of a workpiece normally means the position and posture of the workpiece, but in the case where it is not necessary to take the posture of a workpiece into consideration in taking out the workpiece with the robot, such as the case where a workpiece has a spherical shape, etc., only the position may be represented.

Figure 2:
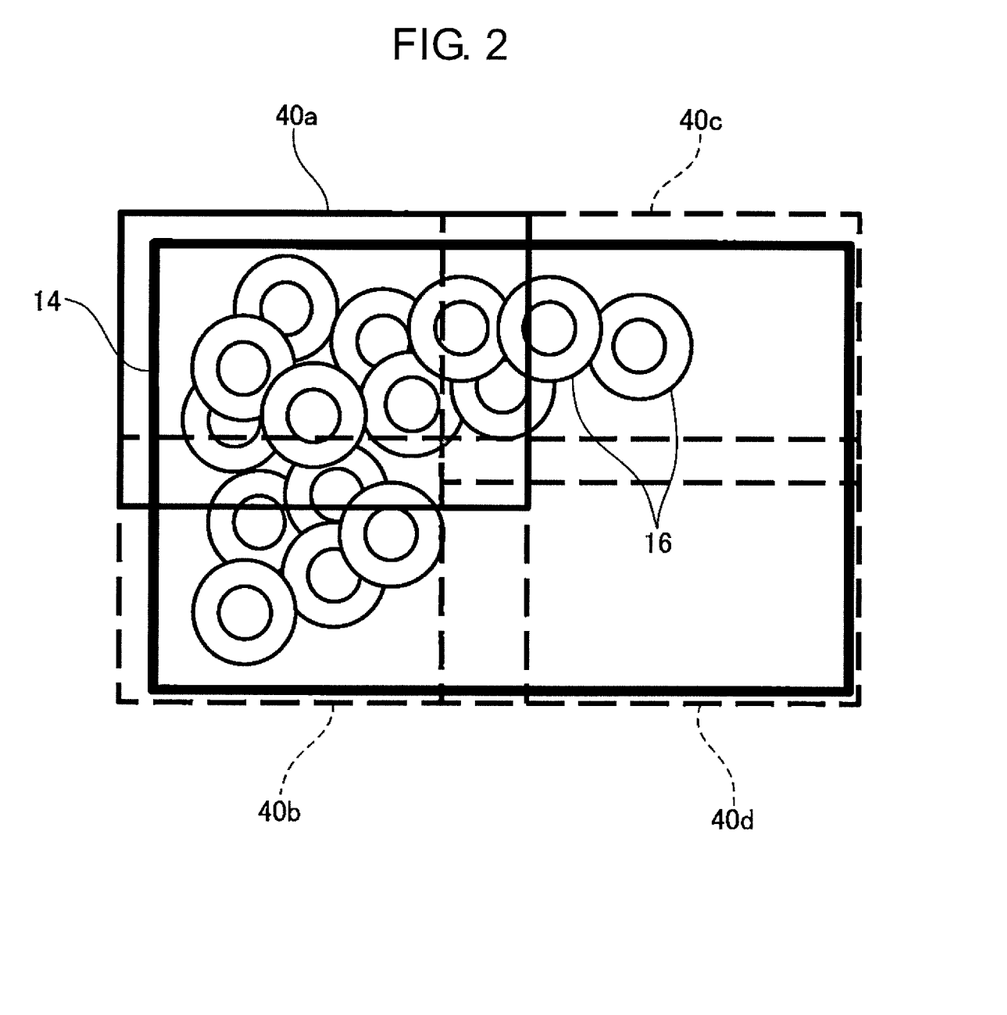
FIG. 2 is a view illustrating one example of a relation of a working area and a measurement area.

FIG. 2 is a view of a container 12 (working area 14) viewed from above wherein a plurality of workpieces 16 are randomly arranged. The working area 14 in which the workpieces 16 may be present is larger than the measurement area of the sensor 22, and thus one-time measurement with the sensor 22 fails to measure the entire working area 14, and therefore it is necessary to conduct measurements at least two times (at two positions) in order to measure the entire working area 14. In the present embodiment, it is assumed that measurements at four positions are required to measure the entire working area 14, and the four positions are referred to as "(first to fourth) sensor measurement positions". Further, measurement areas corresponding to the respective first to fourth sensor measurement positions are regarded as first to fourth measurement areas 40a to 40d, respectively.

Figure 3:
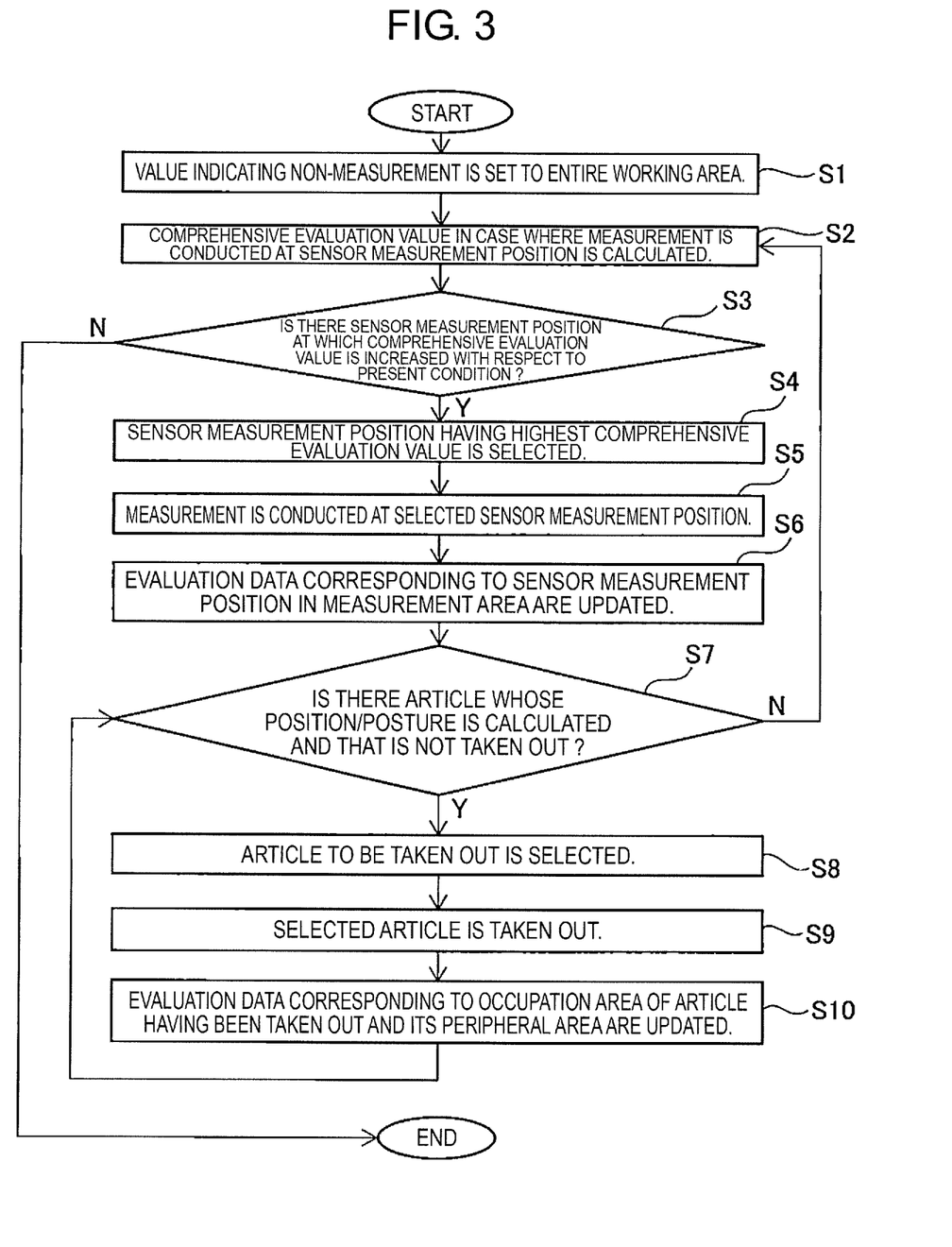
FIG. 3 is a flowchart illustrating one example of processing in a first embodiment.

FIG. 3 is a flowchart illustrating one example of processing (article takeout method) in a first embodiment. First, at Step S1, a value (e.g., zero) indicating non-measurement is set to the entire working area.

Subsequently, at Step S2, the comprehensive evaluation value in a case where the measurement of the working area is conducted at each sensor measurement position is calculated. Herein, the comprehensive evaluation value is a value serving as an indicator for evaluating a measurement state of the entire working area 14 and is calculated on the basis of evaluation data that are updated every time a certain measurement area is measured. In addition, the evaluation data is, e.g., a value representing whether measurement has been conducted or has yet to be conducted by the sensor 22 for each minuscule area (cell) obtained by dividing each measurement area at predetermined intervals. For example, the working area 14 has a rectangular shape of 500 mm×340 mm in a planar view, and each measurement area has rectangular shape of 300 mm×200 mm in a planar view, and further, when each measurement area is divided into a square whose one side has a length of 1 mm, each measurement area includes 60000 cells. Herein, further, in a case where "1" is set to the cell as the evaluation data when a certain cell has been already measured, and "0" is set to the cell when a certain cell is not measured yet, the maximum value of the sum of evaluation data on cells of each measurement area is 60000 (the minimum value is zero). In addition, as illustrated in FIG. 2, since each measurement area has overlapping areas to some extent to securely detect an article in the vicinity of a boundary, the comprehensive evaluation value of the entire working area simply does not correspond to 240000 (60000×4) but corresponds to, e.g., 170000. Thus, when S2 is initially executed, the comprehensive evaluation value reaches zero because all the measurement areas are not measured yet.

Subsequently, at Step S3, it is determined whether there is at least one sensor measurement position (measurement area) that causes the comprehensive evaluation value to be increased by the next measurement with respect to the present condition. Herein, when S3 is initially executed, as illustrated in A to D sections in FIG. 4, and measurement is conducted at any sensor measurement position, the evaluation data of each of 60000 cells in the measured area are updated from zero to 1, and the comprehensive evaluation value increases from zero to 60000 accordingly, and the processing proceeds to Step S4.

Subsequently, at Step S4, a sensor measurement position having the highest comprehensive evaluation value as the result of conducting the measurement (and updating described later) is selected. In this regard, when the Step S4 is initially executed, the comprehensive evaluation value reaches 60000 whatever measurement area is measured, and thus any of the first to fourth measurement areas can be selected, but herein, as illustrated in the A section in FIG. 4, it is assumed that a first measurement area 40a (a first sensor measurement position) is selected.

Subsequently, at Step S5, the measurement of the working area 14 (the first measurement area 40a) is conducted by the sensor 22 at the selected sensor measurement position, and the position/posture of each workpiece 16 is detected on the basis of the measurement result (the image processing result of a sensor image). Subsequently, at Step S6, evaluation data corresponding to the measured measurement area 40a are updated. Thus, herein, the sum of the evaluation data of the first measurement area 40a becomes 60000, and in other measurement areas, only the evaluation data of cells overlapped with the first measurement area 40a is updated from zero to 1.

Figure 4:
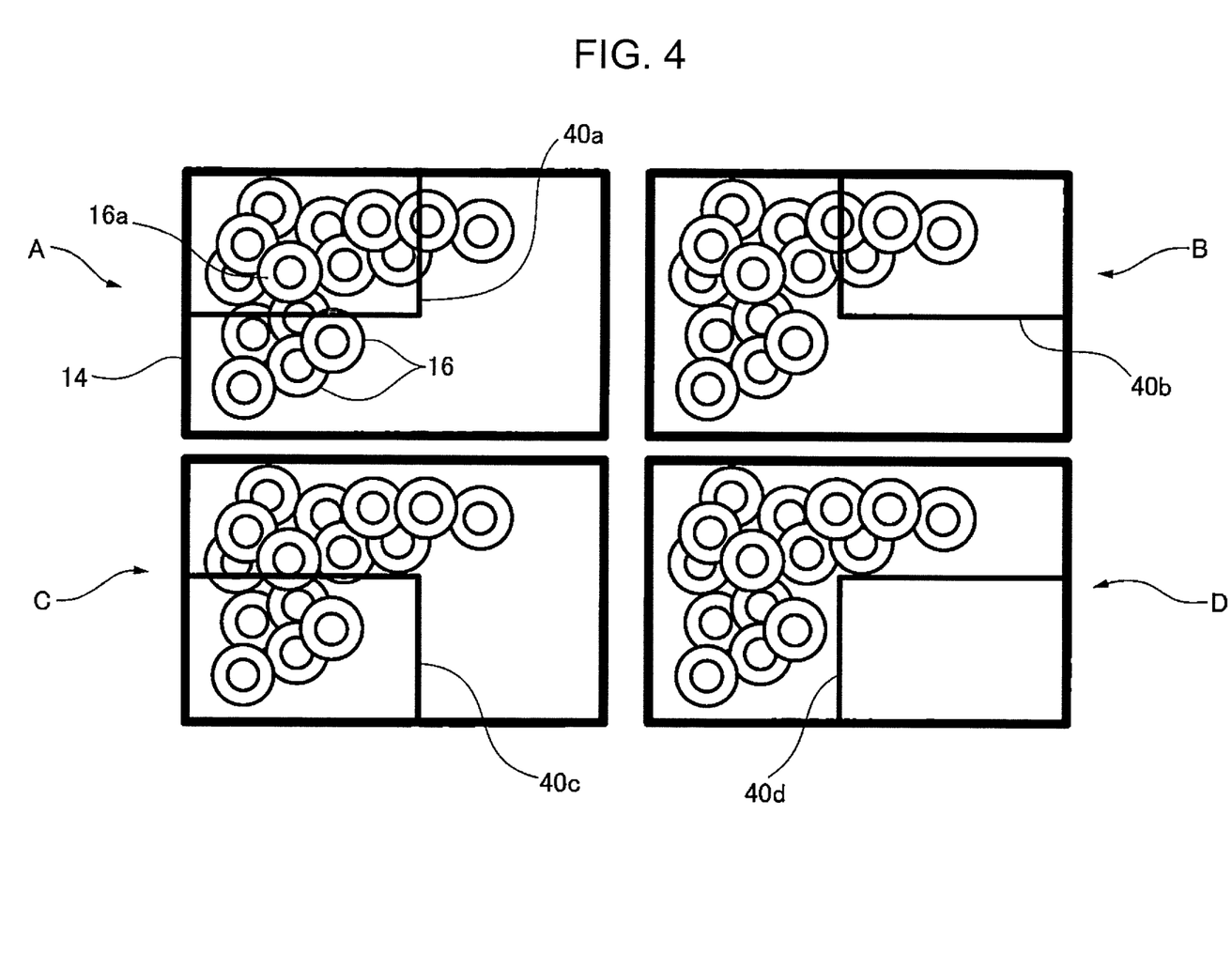
FIG. 4 is a view illustrating an example of change in evaluation data after the working area is measured at each sensor measurement position in initial measurement.

Subsequently, at Step S7, it is determined whether there are workpieces that have not been taken out by the robot, out of workpieces the position/posture of which is detected at Step S5. Herein, as illustrated in FIG. 4, when a plurality of workpieces 16 are present in the measurement area 40a, it is possible to detect the positions/postures of the plurality of workpieces 16 at one measurement, but the workpieces are normally taken out one by one, so that it is preferable that information on the positions/postures of the workpieces that have not been taken out be stored in the above-described data storage 32 (memory), etc.

When at least one workpiece that can be taken out (whose position/posture is detected) in the measurement area is present, at Step S8, a workpiece to be taken out (a workpiece 16a in the example in FIG. 4) is selected, and the selected workpiece is taken out by the robot 18 (Step S9). It is noted that at Step S8 and Step S9, for example, a workpiece that is most suitable to be taken out (e.g., positioned uppermost) is detected and selected, and the operation of taking out the workpiece, etc., is performed by controlling the robot 18, but this processing itself can be executed by using the related art, and thus the detailed description thereof will be omitted.

Figure 5:
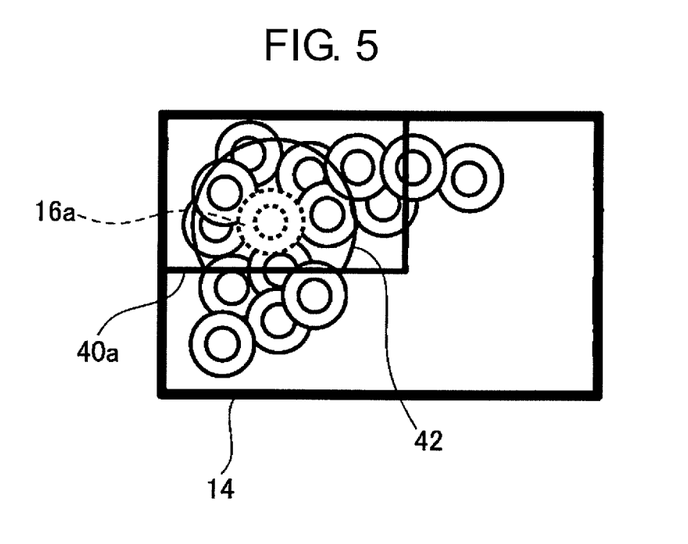
FIG. 5 is a view illustrating an example of change in evaluation data after a workpiece in a first measurement area is taken out.

Subsequently, at Step S10, the evaluation data on at least the area where the workpiece 16 having been taken out has been present is updated. For example, as illustrated in FIG. 5, when the workpiece 16a illustrated in a dashed line is taken out, an area (circle) where the workpiece 16a has been present (has occupied) becomes a non-measurement area (because an area covered with the workpiece 16a emerges), and thus evaluation data corresponding to the circular area (each cell therein) is updated to a value that is lower than 1 (e.g., zero).

In addition, as for an area 42 (i.e., a peripheral area) within a certain distance from the workpiece 16a, there is a possibility that the positions/postures of other workpieces change due to the takeout of the workpiece 16a, so that it is preferable to update the corresponding evaluation data to a value that is lower than 1 and higher than the updated value (e.g., zero) of the above-described occupation area. For example, when the evaluation data on each cell is all "1" prior to the takeout of the workpiece 16a, the evaluation data after the takeout of the workpiece 16a can be provided as a value obtained by subtracting a value "s" indicated by the following equation (1) from "1". In equation (1), "d" represents a distance between the corresponding cell and the center of the workpiece 16a, and "L" represents a predetermined distance (e.g., three times the radius of the workpiece) that is larger than d.

$$s = \begin{cases} 1 - d/L & (d \leq L) \\ 0 & (d > L) \end{cases} \quad (1)$$

According to the equation (1), the evaluation data of each cell within a determined distance (e.g., one to three times the radius of a workpiece) from the center of the workpiece 16a is updated to a value between "0" and "1" in accordance with a distance from the workpiece 16a, and the evaluation data of each cell in the area apart from the center of the workpiece 16a by a determined distance or more do not change from "1". Thus, herein, the total value of the evaluation data of the cells in the first measurement area is reduced depending on the conditions under which the workpieces are taken out, and the comprehensive evaluation value is reduced from 60000 accordingly.

It is noted that at Steps S7 to S10, if a workpiece that can be taken out is present in the first measurement area 40a (the position/posture is detected), processing in which the workpiece is taken out, and the evaluation data is updated, is repeated.

If there is no workpiece that can be taken out in the measured area, the processing of the second S2 and S3 is performed. In the present embodiment, when measurement is conducted at any of the first to fourth sensor measurement positions, the comprehensive evaluation value is increased after the measurement (update), but in the first measurement area 40a, the area except for the periphery of the workpiece having been taken out, i.e., the area in the first measurement area 40a and on the outside of the peripheral area 42 has already been measured, and therefore the amount of variation (amount of increase) in the comprehensive evaluation value after the update is small, compared with an amount of variation of any of the other three areas. In addition, as for the comparison of the second to fourth sensor measurement positions that are not measured yet, the measurement at the sensor measurement position corresponding to the measurement area including the smallest area of a section overlapped with the first measurement area brings the highest comprehensive evaluation value, and thus, as illustrated in a section D in FIG. 6 in the present embodiment, at Step S4, the fourth sensor measurement position is selected, and the measurement at the fourth sensor measurement position is conducted, and the update of the evaluation data is performed (Steps S5 and S6).

Figure 6:
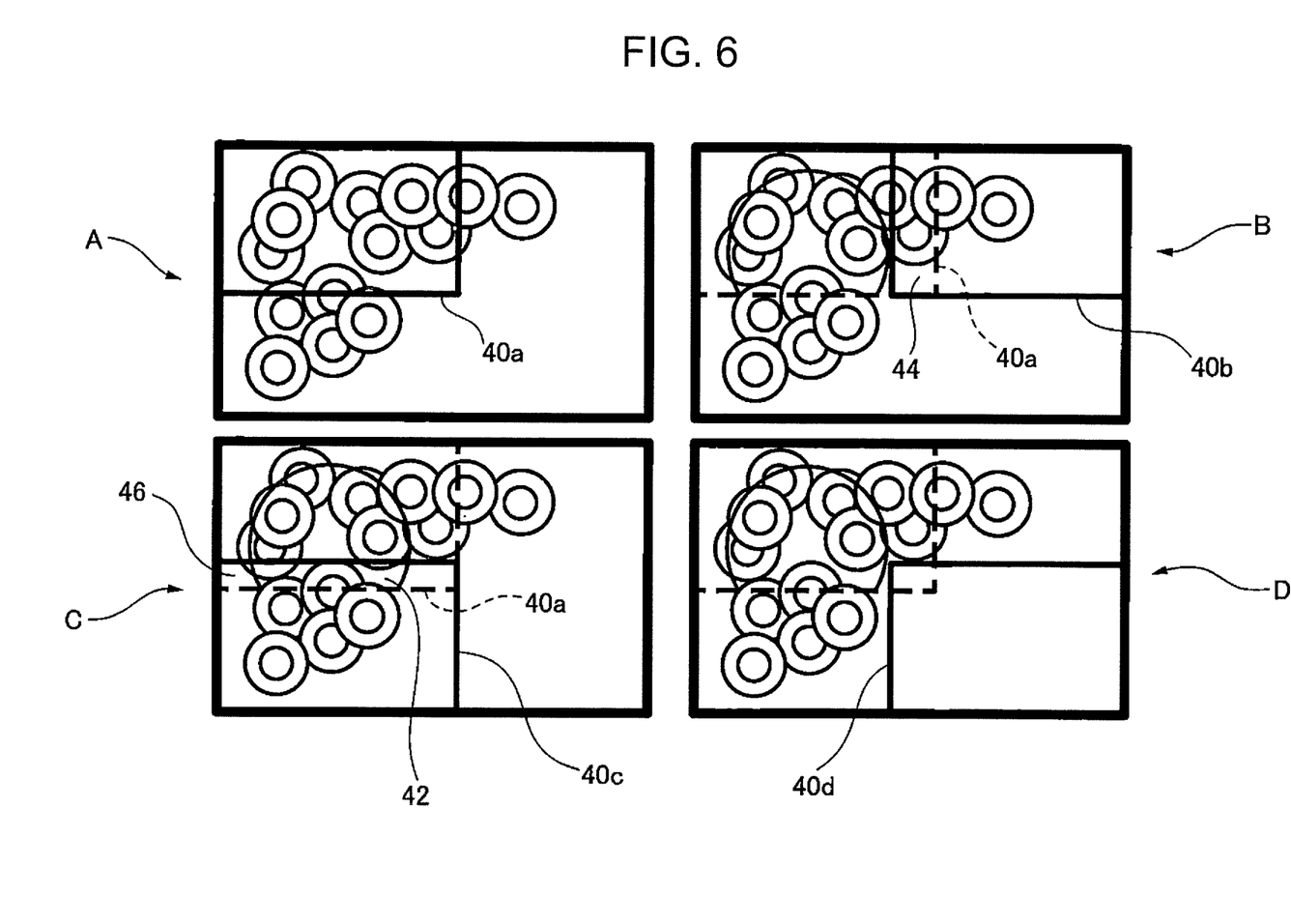
FIG. 6 is a view illustrating an example of change in evaluation data after the working area is measured at each sensor measurement position in a second measurement.
Figure 7:
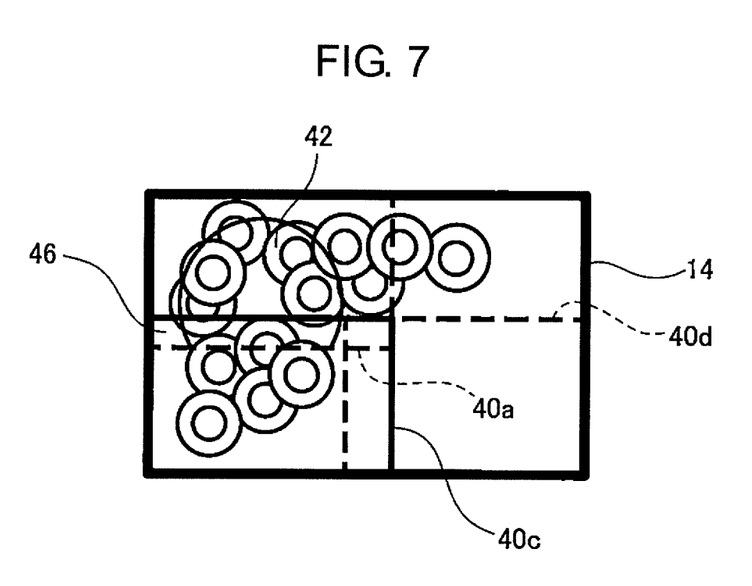
FIG. 7 is a view illustrating an example of change in evaluation data after the working area is measured at a third sensor measurement position in a third measurement.

In the present embodiment, there is no workpiece in the fourth measurement area 40d from the beginning, and thus the processing of Steps S8 to S19 is not executed, and the processing returns from Step S7 to Step S2. Then, in the third Step S2, the third sensor measurement position is selected as a sensor position at which the highest comprehensive evaluation value is obtained at the next measurement. This is because, as illustrated in FIG. 6 or 7, an area (cell) whose evaluation data is updated to a value less than 1 is not included in an overlapping section 44 between the first measurement area 40a and the second measurement area 40b, whereas a part of the area 42 (cell) whose evaluation data is updated to a value less than 1 is included in an overlapping section 46 between the first measurement area 40a and the third measurement area 40c by taking out the workpiece 16a, and thus the measurement of the third measurement area 40c results in a high comprehensive evaluation value.

It is noted that at the fourth Step S3, the second sensor measurement position (a measurement area 40b) that has not been measured even one time is selected. As such, after all the workpieces in the working area are taken out by repeating the above-described processing, at Step S3, it is determined that the comprehensive evaluation value is not increased (does not change) even if measurement is conducted at any of the sensor measurement positions, and thus a series of processing is completed.

In the present embodiment, there is no workpiece in the fourth measurement area 40d, and thus the comprehensive evaluation value at the fourth sensor measurement position is not reduced due to the takeout of a workpiece after the fourth measurement area 40d has been measured one time. Consequently, if the fourth measurement area 40d is measured again, the comprehensive evaluation value is not increased, and therefore measurement is not conducted at the fourth sensor measurement position two times or more. In addition, as for each of the first to third sensor measurement positions, when the workpiece in the corresponding measurement area is taken out, the value of the evaluation data on the occupation area thereof (or the occupation area and its peripheral area) is reduced, and thus it is determined that the amount of variation (amount of increase) of the comprehensive evaluation value due to the next measurement (update) is great, and the first, second or third sensor measurement position is preferentially selected as a sensor measurement position. Further, as for each of the first to third sensor measurement positions, after all the workpieces in the corresponding measurement area are taken out, measurement is not conducted at the sensor measurement position two times or more. Consequently, in the present embodiment, useless measurements can be automatically removed, and a time required for the takeout operation can be reduced.

In the related art, as illustrated in FIG. 2, when the measurement range of the sensor is smaller than the working area, the processing in which the sensor is moved to multiple sensor measurement positions in fixed order (e.g., first-→second→third→fourth→first→second→ . . . ) every time the workpiece is taken out has been performed. However, as illustrated in FIG. 2, when the plurality of workpieces are unevenly distributed in the working area, the measurement area (the measurement area 40d in the example in FIG. 2) in which there is no workpiece at all is measured over and over again, which leads up to the repetition of the useless measurements. In contrast, in the present embodiment, the above-described useless measurements can be automatically removed, and as a result, a time required for taking out the plurality of articles can be substantially shortened, so that an efficient system can be structured.

Second Embodiment

Figure 8:
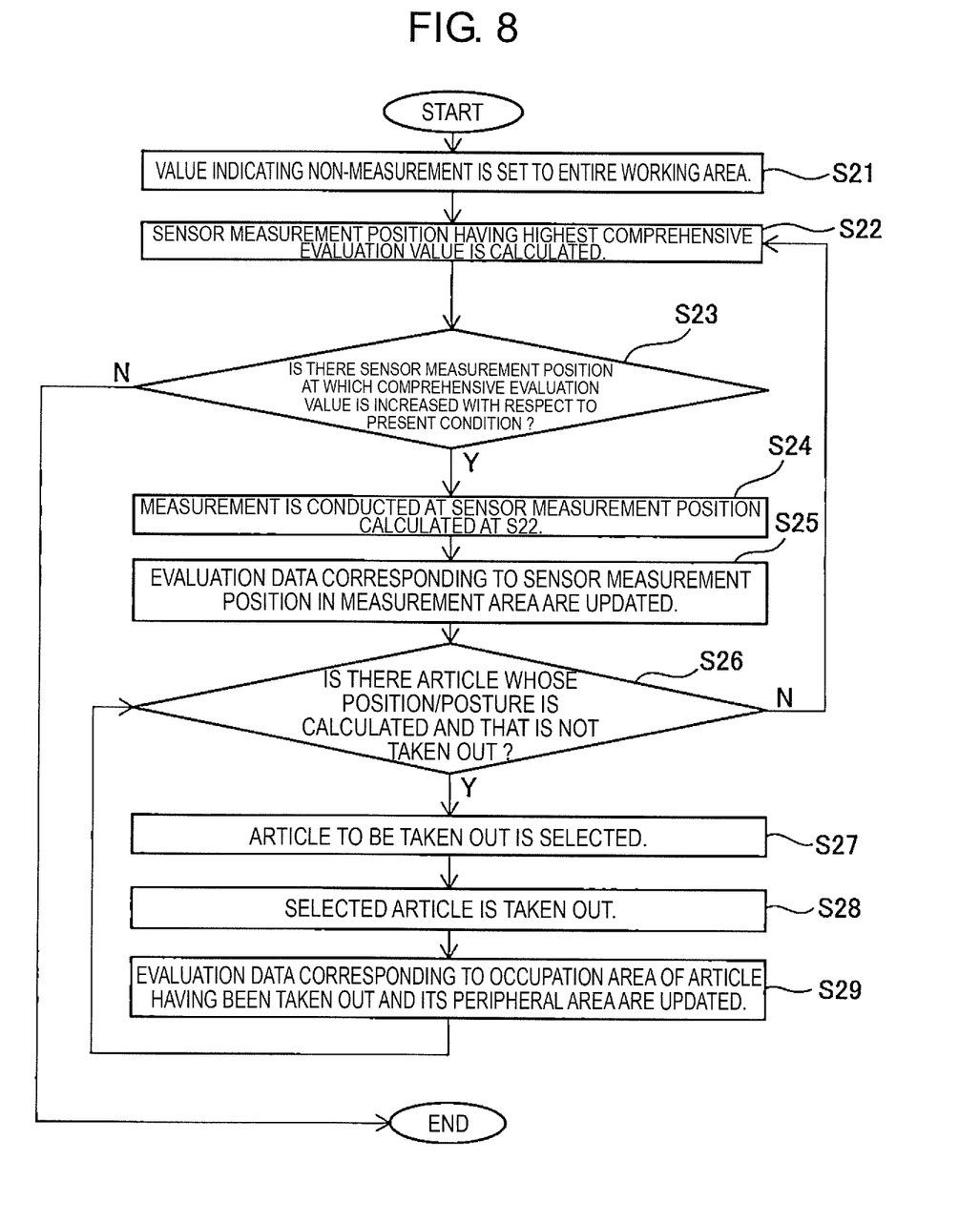
FIG. 8 is a flowchart illustrating one example of processing in a second embodiment.

FIG. 8 is a flowchart to explain a second embodiment. It is noted that, in the second embodiment, only features different from those of the first embodiment are described, and descriptions regarding other features identical to those of the first embodiment will be omitted.

In the second embodiment, unlike the first embodiment in which measurement is conducted at the plurality (first to fourth) of predetermined sensor measurement positions, the sensor position selector 38 causes the sensor measurement positions to automatically change at predetermined distance intervals, thereby automatically acquiring, on the basis of calculation, a sensor measurement position having the highest comprehensive evaluation value (Step S22).

As one example, distance intervals in the case of changing sensor measurement positions can be set in a grid form. For example, when the working area 14 has a rectangular shape of 500 mm×340 mm in a planar view, the working area 14 is virtually divided into a grid of 10 mm×10 mm, and while the sensor measurement position is sequentially moved to the vertices of the grid, the comprehensive evaluation value in the case where measurement is conducted at each position can be calculated. It is noted that the distance intervals in the case where the sensor measurement positions are changed may be regular intervals such as 10 mm described above or 20 mm, or intervals may be appropriately changed in accordance with a place in the working area. The distance intervals in changing the sensor measurement positions are appropriately set and changed in accordance with the specifications of the sensor 22, allowable processing time, etc.

Alternatively, as another example in which the sensor measurement position having the highest comprehensive evaluation value is automatically acquired on the basis of calculation, the numerical gradient of the comprehensive evaluation value can be utilized. For example, by repeating calculation in which a first comprehensive evaluation value is acquired at each of a plurality of predetermined initial sensor measurement positions, and a second comprehensive evaluation value is acquired in a case where a sensor position is changed by a certain (minuscule) distance in a predetermined direction (e.g., in the four directions of +X, −X, +Y, and −Y in the case where the working area is assumed to be an X-Y plane), when the second comprehensive evaluation value is greater than the first comprehensive evaluation value, the comprehensive evaluation value is acquired by changing the sensor position in the same direction further by a certain distance, and the sensor measurement position at which the comprehensive evaluation value is the extremum can be acquired while each initial sensor measurement position serves as a starting point. Subsequently, a position having the maximum comprehensive evaluation value, out of the plurality of sensor measurement positions at which the comprehensive evaluation value is the extremum, the sensor measurement positions being acquired in the above-described manner, can be selected and determined as "sensor measurement position having the maximum comprehensive evaluation value". This manner can efficiently prevent the sensor position from moving from the initial sensor measurement position in the direction in which the comprehensive evaluation value is reduced, so that, in particular, when the evaluation data are composed of the enormous number of cells, an optimal sensor measurement position can be efficiently determined, rather than the calculation of the comprehensive evaluation value with all the cells. It is noted that there is no specific limitation as for the plurality of initial sensor measurement positions, and, e.g., fixed positions that an operator, etc., designates in advance may be applied, or an arithmetic processing unit may randomly determine them. However, even when the initial sensor measurement positions are randomly selected, it is preferable that the plurality of initial sensor measurement positions be arranged in a distributed manner to some extent (arranged while being separated from each other with a predetermined distance or more apart).

At subsequent Step S23, it is determined whether there is at least one sensor measurement position (measurement area) that causes the comprehensive evaluation value to be increased with respect to the present condition when the (next) measurement is conducted at the sensor measurement position calculated at Step S22, in other words, whether a sensor measurement position that causes the comprehensive evaluation value to be increased with respect to the present condition by the next measurement is calculated at Step S22. Then, at Step S24, the sensor 22 is moved to the sensor measurement position calculated at Step S22, and the measurement of the working area 14 is conducted. The processing hereinafter may be identical to that in the first embodiment.

In the second embodiment, in addition to the capability of reduction of unnecessary measurements, the need for setting the sensor measurement positions in advance is eliminated, unlike the first embodiment, and thus the article takeout apparatus that reduces a burden of an operator can be structured.

Third Embodiment

Figure 9:
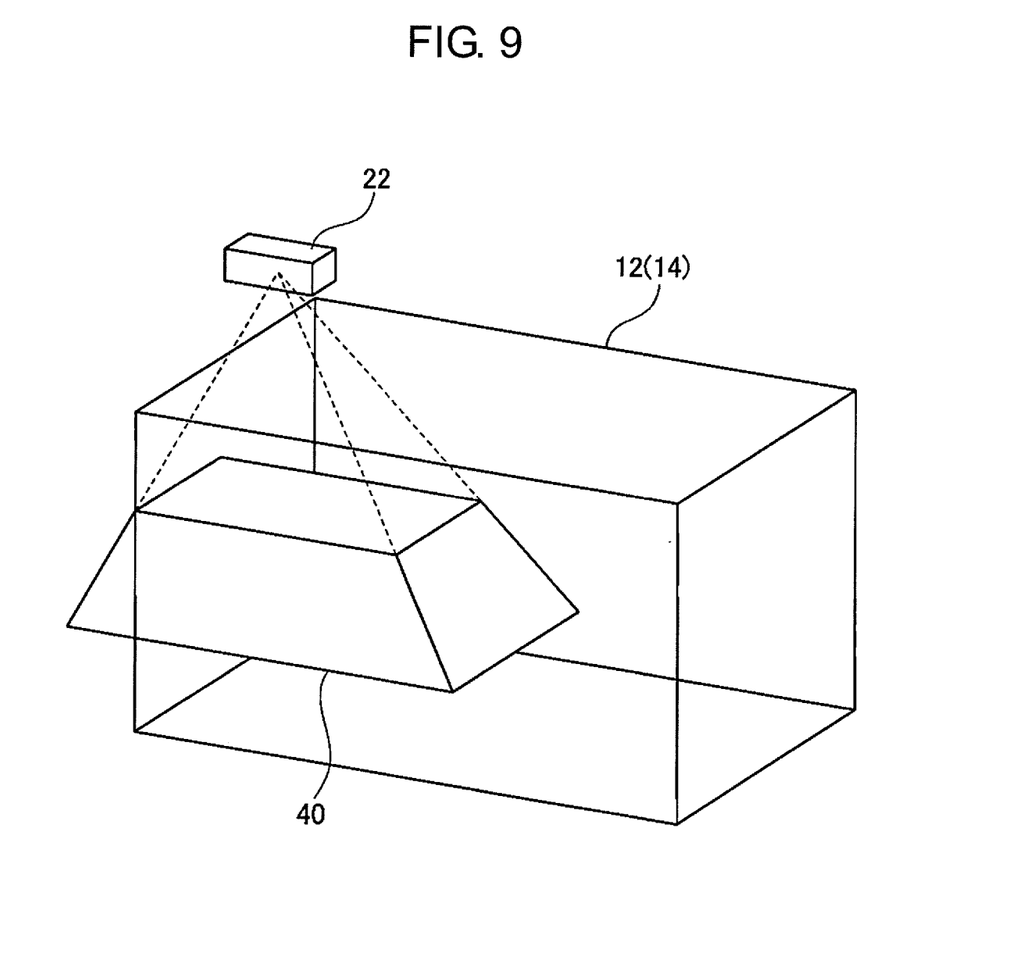
FIG. 9 is a view exemplifying a case where a measurement area has a three-dimensional shape.

FIG. 9 is a view to explain a third embodiment. In the first embodiment, the measurement area of the sensor 22 has been described as two-dimensional area (plane), but, in the third embodiment, a measurement area 40 of the sensor 22 has a three-dimensional shape such as a square truncated pyramid and a truncated cone, and the measurement area 40 can be represented as a set of volume elements like voxel. It is noted that processing in the third embodiment may be identical to that of the first embodiment or the second embodiment, and the detailed description thereof will be omitted.

In the third embodiment, evaluation data can be set as a value corresponding to each volume element. When the measurement area is three-dimensionally represented, an effect that position in a depth direction in the container (working area) can be acquired for each workpiece is obtained, in addition to the identical effects of the first or second embodiment, so that the takeout operation of a robot can be steadily performed.

According to the present disclosure, useless measurements can be eliminated, a time required for movement of the sensor or detection can be saved, and a time required for taking out a plurality of articles can be substantially reduced.

While the invention has been described with reference to specific embodiments, it will be understood, by those skilled in the art, that various changes or modifications may be made thereto without departing from the scope of the following claims.

The invention claimed is:

1. An article takeout apparatus comprising:
a sensor having a measurement range that is smaller than a working area in which a plurality of articles are arranged, and configured to be movable relative to the working area;
a position/posture detector configured to detect a position/posture of the article on a basis of a measurement result of a measurement area that is a part of the working area with the sensor;
a robot configured to take out the plurality of articles arranged in the measurement area on a basis of a detection result of the position/posture detector;
a data storage configured to store evaluation data to evaluate a plurality of sensor measurement positions including a first sensor position at which the sensor measures a first plurality of cells within a first measurement area and a second sensor position at which the sensor measures a second plurality of cells within a second measurement area,
wherein the evaluation data includes:
a first set of cell scores for the first plurality of cells within the first measurement area, the first set of cell scores having values based on whether or not each of the first plurality of cells within the first measurement area has been measured, each respective cell of the first plurality of cells within the first measurement area corresponding to a single respective score of the first set of cell scores, the single respective score of the first set of cell scores having a value based on whether or not the respective cell within the first measurement area has been measured, and
a second set of cell scores for each of the second plurality of cells within the second measurement area, the second set of cell scores having values based on whether or not each of the second plurality of cells within the second measurement area has been measured, each respective cells of the second plurality of cells within the second measurement area corresponding to a single respective score of the second set of cell scores, the single respective score of the second set of cell scores having a value based on whether or not the respective cells within the second measurement area has been measured;
a data update section configured to update the evaluation data after the measurement area is measured by the sensor and after the article is taken out by the robot, the update including:
when the article is taken out from the first measurement area, modifying the first set of cell scores corresponding to a portion of the first measurement area where the article was taken out from,
when the article is taken out from the second measurement area, modifying the second set of cell scores corresponding to a portion of the second measurement area where the article was taken out from,
wherein the modified cell scores have values indicating that the portion where the article was taken out from has not been measured;
an evaluation value calculator configured to calculate a comprehensive evaluation value to evaluate a measurement state of an entirety of the working area on a basis of the updated evaluation data; and
a sensor position selector configured to select a next sensor measurement position of the sensor from among the plurality of sensor measurement positions on a basis of the comprehensive evaluation value.

2. The article takeout apparatus according to claim 1, wherein, when a measurement area including a non-measurement area by the sensor is measured by the sensor, the data update section updates the evaluation data to increase the comprehensive evaluation value.

3. The article takeout apparatus according to claim 1, wherein, when the article is taken out, the data update section updates the evaluation data on an occupation area occupied by the article, or evaluation data on the occupation area and a peripheral area within a predetermined distance from the occupation area to reduce the comprehensive evaluation value on a basis of a position/posture of the article in the working area before the article is taken out.

4. The article takeout apparatus according to claim 1, wherein the sensor position selector selects a sensor measurement position at which the comprehensive evaluation value is maximum, on a basis of an amount of variation of the respective evaluation data in a case where a corresponding measurement area is measured by the sensor at a plurality of sensor measurement positions that are predetermined.

5. The article takeout apparatus according to claim 1, wherein the sensor position selector selects a sensor measurement position at which the comprehensive evaluation value is maximum by causing the sensor measurement position to automatically change.

6. The article takeout apparatus according to claim 1, wherein the evaluation data is a value set for every minuscule area obtained by dividing the measurement area of the sensor corresponding to each sensor measurement position by a predetermined interval.

7. The article takeout apparatus according to claim 1, wherein the measurement area of the sensor has a three-dimensional shape.

8. The article takeout apparatus according to claim 1, wherein the sensor is mounted on a movable section of the robot.

9. An article takeout method using a sensor having a measurement range that is smaller than a working area in which a plurality of articles are arranged and configured to be movable relative to the working area, a position/posture detector configured to detect a position/posture of the article on a basis of a measurement result of a measurement area that is a part of the working area with the sensor, and a robot configured to take out the plurality of articles arranged in the measurement area on a basis of a detection result of the position/posture detector, the articles takeout method comprising:

storing evaluation data to evaluate a plurality of sensor measurement positions including a first sensor position at which the sensor measures a first plurality of cells within a first measurement area and a second plurality of cells within a second sensor position at which the sensor measures a second measurement area, wherein the evaluation data includes:
a first set of position cell scores for the first plurality of cells within the first measurement area the first set of cell scores having values based on whether or not each of the first plurality of cells within the first measurement area has been measured, each respective cell of the first plurality of cells within the first measurement area corresponding to a single respective score of the first set of cell scores, the single respective score of the first set of cell scores having a value based on whether or not the respective cell within the first measurement area has been measured, and a second set of cell scores for the second plurality of cells within the second measurement area, the second set of cell scores having values based on whether or not each of the second plurality of cells within the second measurement area has been measured, each respective cells of the second plurality of cells within the second measurement area corresponding to a single respective score of the second set of cell scores, the single respective score of the second set of cell scores having a value based on whether or not the respective cells within the second measurement area has been measured;

updating the evaluation data after the measurement area is measured by the sensor and after the article is taken out by the robot, the updating including:
when the article is taken out from the first measurement area, modifying the first set of cell scores corresponding to a portion of the first measurement area where the article was taken out from,
when the article is taken out from the second measurement area, modifying the second set of cell scores corresponding to a portion of the second measurement area where the article was taken out from, and
wherein the modified positions scores have values indicating that the portion where the article was taken out from has not been measured;

calculating a comprehensive evaluation value to evaluate a measurement state of an entirety of the working area on a basis of the updated evaluation data; and selecting a next sensor measurement position of the sensor from among the plurality of sensor measurement positions on a basis of the comprehensive evaluation value.

10. The article takeout apparatus according to claim 1, the update including:
when the article is taken out from the first measurement area, modifying a subset of the second set of cell scores corresponding to a portion of the second measurement area that overlaps the first measurement area where the article was taken out from, the modification indicating that the cells in the portion of the second measurement area that overlaps the first measurement area have not been measured, and
when the article is taken out from the second measurement area, modifying a subset of the first set of cell scores corresponding to a portion of the first measurement area that overlaps the second measurement area where the article was taken out from, the modification indicating that the cells in the portion of the first measurement area that overlaps the second measurement area have not been measured.

11. The article takeout method according to claim 9, the update including:
when the article is taken out from the first measurement area, modifying a subset of the second set of cell scores corresponding to a portion of the second measurement area that overlaps the first measurement area where the article was taken out from, and
when the article is taken out from the second measurement area, modifying a subset of the first set of cell scores corresponding to a portion of the first measurement area that overlaps the second measurement area where the article was taken out from.

* * * * *